(12) United States Patent
Economy et al.

(10) Patent No.: US 7,695,820 B2
(45) Date of Patent: Apr. 13, 2010

(54) ALIPHATIC POLYESTERS AND LUBRICANTS CONTAINING THE POLYESTERS

(75) Inventors: James Economy, Urbana, IL (US); Wei Xiao, Spartanburg, SC (US)

(73) Assignee: The Board of Trustees of the University of Illinois, Urbana, IL (US)

(*) Notice: Subject to any disclaimer, the term of this patent is extended or adjusted under 35 U.S.C. 154(b) by 544 days.

(21) Appl. No.: 11/421,220

(22) Filed: May 31, 2006

(65) Prior Publication Data

US 2007/0111037 A1 May 17, 2007

Related U.S. Application Data

(60) Provisional application No. 60/702,430, filed on Jul. 26, 2005.

(51) Int. Cl.
*B32B 27/36* (2006.01)
*G11B 5/725* (2006.01)
*C10M 107/32* (2006.01)
*C08G 63/12* (2006.01)
*C08G 63/16* (2006.01)

(52) U.S. Cl. .............. 428/480; 428/825; 428/825.5; 428/835.6; 528/302; 508/459; 508/463; 508/496

(58) Field of Classification Search .............. None
See application file for complete search history.

(56) References Cited

U.S. PATENT DOCUMENTS

| | | | | |
|---|---|---|---|---|
| 3,790,478 A | * | 2/1974 | Rudston et al. ........ | 508/298 |
| 4,118,331 A | * | 10/1978 | Jahnke ........ | 508/306 |
| 4,122,073 A | * | 10/1978 | Georgoudis ........ | 525/127 |
| 4,124,571 A | * | 11/1978 | Georgoudis ........ | 527/311 |
| 4,159,958 A | * | 7/1979 | de Vries ........ | 508/409 |
| 4,199,647 A | * | 4/1980 | Newkirk et al. ........ | 428/394 |
| 5,141,658 A | * | 8/1992 | DiBiase ........ | 508/192 |
| 5,587,217 A | | 12/1996 | Chao et al. | |
| 6,043,199 A | * | 3/2000 | Godici ........ | 508/285 |
| 6,211,306 B1 | * | 4/2001 | Epple et al. ........ | 525/445 |
| 6,565,719 B1 | | 5/2003 | Lairson et al. | |
| 6,673,429 B1 | | 1/2004 | Ma et al. | |
| 6,682,807 B2 | | 1/2004 | Lairson et al. | |
| 6,686,019 B1 | | 2/2004 | Liu et al. | |
| 6,753,060 B1 | | 6/2004 | Liu et al. | |
| 6,764,757 B1 | | 7/2004 | Wu et al. | |

(Continued)

FOREIGN PATENT DOCUMENTS

EP     0 786 510     * 7/1997

(Continued)

OTHER PUBLICATIONS

Solvay Solexis, Fomblin Z Derivatives, Product Data Sheet, 3 pages, Dec. 13, 2002.

(Continued)

*Primary Examiner*—Vivian Chen
(74) *Attorney, Agent, or Firm*—Evan Law Group LLC

(57) ABSTRACT

Aliphatic polyesters may be substituted at the alpha- and beta-positions. These aliphatic polyesters may have increased thermal, chemical and hydrolytic stability compared to conventional aliphatic polyesters. In addition, these aliphatic polyesters may be used as high performance lubricants, including lubricants for hard disk drives.

10 Claims, 4 Drawing Sheets

100

Heating a reaction mixture to form an aliphatic polyester, the reaction mixture including
- a diacid monomer of formula XII and
- a diol monomer of formula XI
⟶ 110

Treating the aliphatic polyester with a monofunctional reagent ⟶ 120

U.S. PATENT DOCUMENTS

| | | | |
|---|---|---|---|
| 7,087,313 B2 * | 8/2006 | Sawai et al. | 428/480 |
| 2004/0068059 A1 * | 4/2004 | Katayama et al. | 525/466 |

FOREIGN PATENT DOCUMENTS

| | | | |
|---|---|---|---|
| GB | 1345108 | * | 2/1974 |
| JP | 58-103519 | * | 6/1983 |

OTHER PUBLICATIONS

Solvay Solexis, Fomblin® PFPE Lubricants, Product Data Sheet, 5 pages Oct. 14, 2004.

Johnson, K.E., et al. "Thin-film media-Current and future technology", IBM J. Res. Develop., vol. 40, No. 5, pp. 511-536, Sep. 1996.

Xiao, et al., Design of Sterically Hindered Polyesters as Lubricants for Hard Disk Drives, Proceedings of the 228$^{th}$ ACS National Meeting, Philadelphia, PA, Aug. 22-26, 2004.

Xiao, W., et al., "Design of Sterically Hindered Polyesters as Lubricants for Hard Disk Drives," Abstract, 228$^{th}$ ACS National Meeting, Philadelphia, PA, Aug. 22-26, 2004.

Fabio, B., "The application of Advanced Materials to Four Unique Problems Involving Surface Interfaces," Master of Science Thesis at University of Illinois, pp. 61-89, 1997.

Press Release from American Chemical Society, "Computer Hard Drives Perform Better, Last Longer with Novel Polyester Lubricant", Aug. 25, 2004.

Stevens, M.; Polymer Chemistry: An Introduction, 3rd Edition; New York: Oxford University Press, pp. 338-363, 1999.

Doerner, M.F. et al., "Materials Issues in Magnetic-Disk Performance" MRS Bulletin, vol. 21, No. 9, (1996).

Owens, D.K. "Friction of Polymer Films. I. Lubrication", Journal of Applied Polymer Science, vol. 8, pp. 1465-1475, (1964).

Sianesi, D. et al., "Perfluoropolyethers: Their Physical Properties and Behaviour at High and Low Temperatures", Wear, 18, pp. 85-100, (1971).

Fischer, C. et al., "Ordering processes in polyester thermoplastic elastomers", Polymers for Advanced Technologies 5(5), pp. 292-295, (1994).

Creger, P.L. "Metalated Carboxylci Acids. I. Alkylation", Journal of the American Chemical Society 89:10, pp. 2500-2501, (1967).

Washo, B.D., "Rheology and Modeling of the Spin Coating Process", IBM Journal of Research and Development, 21, pp. 190-198 (1977).

Scarati, A.M. et al., "Frictional Behaviour and Wear Resistance of Rigid Disks Lubricated with Neutral and Functional Perfluoropolyethers", IEEE Transactions on Magnetics, vol. Mag-23, No. 1, pp. 106-108 (1987).

* cited by examiner

100

- 110 Heating a reaction mixture to form an aliphatic polyester, the reaction mixture including
  - a diacid monomer of formula XII and
  - a diol monomer of formula XI

- 120 Treating the aliphatic polyester with a monofunctional reagent

ALIPHATIC POLYESTERS AND LUBRICANTS CONTAINING THE POLYESTERS

REFERENCE TO RELATED APPLICATIONS

This application claims the benefit of U.S. Provisional Application No. 60/702,430 entitled "Aliphatic Polyesters And Lubricants Containing The Polyesters" filed Jul. 26, 2005, which is incorporated by reference in its entirety.

BACKGROUND

High performance lubricants are used for a large number of diverse applications. The requirements of these lubricants are becoming more demanding due to a variety of factors, including miniaturization of electronic and mechanical devices, use of high temperature operating conditions, an increased expectation of product lifetimes, and an expanding range of operating and storage environments. In addition to providing acceptable lubrication to surfaces, lubricants also may need to offer thermal stability, chemical inertness, wear resistance, low volatility and/or corrosion resistance, depending on the particular application.

One application in which high performance lubricants are subject to ever increasing demands is hard disk drive magnetic recording systems. These systems use a collection of rigid disks, each coated with a thin layer of magnetic material and then with a protective layer, typically of amorphous carbon. The lubricant is applied to the surface of the disk over the protective layer. Due to the demand for higher density storage and faster data transfer rates, the lubricant film typically is only 1-2 nanometers (nm) thick. A disk is rotated at speeds greater than 15,000 revolutions per minute (rpm) during operation, which can cause non-uniform distribution of the lubricant or, in some cases, spin-off of a portion of the lubricant. In addition, these devices are expected to last for approximately $10^{10}$ revolutions, including an estimated 7,500 start-stop operations. Hard disk drives are expected to operate acceptably from 5° C. to 60° C. and from 8% to 80% relative humidity, and shipping and storage environments can range from −40° C. to 65° C. In order to avoid failure, the lubricant should not volatilize or experience hydrolytic or thermal instability during the life of the hard drive.

Conventional hard disk drive lubricants are typically perfluoropolyethers (PFPE's), such as the Fomblin® PFPE's available from Solvay Solexis, Inc. (Thorofare, N.J.). The performance and lifetime of PFPE lubricants can be limited by their thermal and chemical stability, as well as their static friction and adhesion properties. Local temperatures on the disk surface can reach 200° C. or greater during the recording process, a temperature at which PFPE's typically degrade and vaporize. Degradation of fluoroethers also can occur chemically at elevated temperatures by exposure to the Lewis acidity of the $Al_2O_3$/TiC material typically present on read-write heads, which record or read the information in the magnetic layer. The static friction coefficient of PFPE's can be prohibitively high as the lubricant film thickness increases, placing an upper limit on the amount of lubricant that can be present to protect the disk.

Aliphatic polyesters were studied as a possible improvement over PFPE lubricants. In a Master of Science thesis at University of Illinois in 1997 entitled "The Applications Of Advanced Materials To Four Unique Problems Involving Surface Interfaces", by Brian Fabio, chapter 4 (pp. 61-89) disclosed a polyester formed from 2,2-diethyl-1,3-propanediol, 2-ethyl-2-methyl-1,3-propanediol, and 2,2,6,6-tetramethylheptanedioic acid; and a polyester formed from these monomers in addition to 2,2,5,5-tetramethylhexanedioic acid. Although these polymers are disclosed as having potential for general lubrication, the thesis specifically states that it could not be predicted whether the polymers would be useful for lubrication of hard disk drives until specific tests are carried out (pp. 75, 79, 85, 87-88). These tests include friction tests at normal loads of 2-4 grams and surface energy measurements performed in a controlled atmosphere.

A lubricant that has increased thermal and chemical stability would be beneficial. It would be desirable to provide more stable lubricants that could also have friction and wear properties that are comparable to or better than conventional lubricants.

SUMMARY

In one aspect, the invention provides an aliphatic polyester including monomer units of formula III and monomer units of formula II:

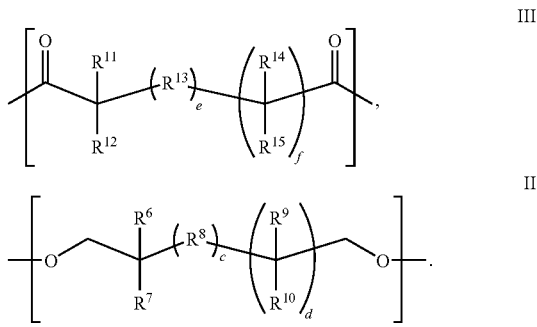

In the monomer units of formula III, $R^{11}$, $R^{12}$, $R^{13}$, $R^{14}$ and $R^{15}$ are independently hydrocarbon groups containing from 1 to 10 carbon atoms, e is 0 or 1, f is 0 or 1 when e is 0, and f is 1 when e is 1; where, when e is 1 and $R^{13}$ contains 2 or 3 carbon atoms, at least one of $R^{11}$ and $R^{14}$ contains from 2 to 10 carbon atoms. In the monomer units of formula II, $R^6$, $R^7$, $R^8$, $R^9$ and $R^{10}$ are independently hydrocarbon groups containing from 1 to 10 carbon atoms, c is 0 or 1, d is 0 or 1 when c is 0, and d is 1 when c is 1.

In another aspect, the invention provides a method of making an aliphatic polyester including heating a reaction mixture to form an aliphatic polyester, where the reaction mixture includes a diacid monomer of formula XIII and a diol monomer of formula XI:

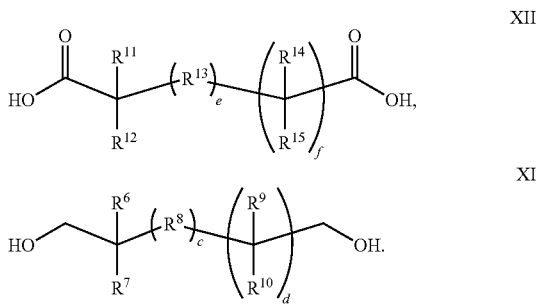

In the diacid monomer of formula XII, $R^{11}$, $R^{12}$, $R^{13}$, $R^{14}$ and $R^{15}$ are independently hydrocarbon groups containing from 1 to 10 carbon atoms, e is 0 or 1, f is 0 or 1 when e is 0, and f is 1 when e is 1; where, when e is 1 and $R^{13}$ contains 2 or 3 carbon atoms, at least one of $R^{11}$ and $R^{14}$ contains from 2 to 10 carbon atoms. In the diol monomer of formula XI, $R^6$, $R^7$, $R^8$, $R^9$ and $R^{10}$ are independently hydrocarbon groups containing from 1 to 10 carbon atoms, c is 0 or 1, d is 0 or 1 when c is 0, and d is 1 when c is 1.

In yet another aspect, the invention provides a lubricant including an aliphatic polyester as described above.

In yet another aspect, the invention provides a method of lubricating a surface including coating the surface with a lubricant containing an aliphatic polyester as described above.

In yet another aspect, the invention provides a method of lubricating a surface including coating the surface with an aliphatic polyester as described above.

In yet another aspect, the invention provides a hard disk drive including a magnetic disk and a film of a lubricant on the disk surface. The lubricant contains an aliphatic polyester as described above.

In yet another aspect, the invention provides a hard disk drive including a magnetic disk and a film of an aliphatic polyester as described above on the disk surface.

In yet another aspect, the invention provides a hard disk drive including a magnetic disk and a lubricant film on the disk surface. The lubricant film contains an aliphatic polyester including monomer units of formula I and monomer units of formula II:

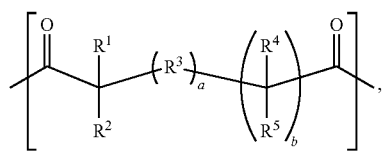

I

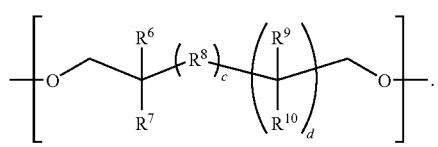

II

In the monomer units of formula I, $R^1$, $R^2$, $R^3$, $R^4$ and $R^5$ are independently hydrocarbon groups containing from 1 to 10 carbon atoms, a is 0 or 1, b is 0 or 1 when a is 0, and b is 1 when a is 1. In the monomer units of formula II, $R^6$, $R^7$, $R^8$, $R^9$ and $R^{10}$ are independently hydrocarbon groups containing from 1 to 10 carbon atoms, c is 0 or 1, d is 0 or 1 when c is 0, and d is 1 when c is 1.

The following definitions are included to provide a clear and consistent understanding of the specification and claims.

The term "polymer" means a substance containing multiple monomer units in a linear, branched or cyclic chain. As used herein, the term "polymer" includes both polymers and oligomers.

The term "polyester" means a polymer containing two or more ester groups (—C(=O)—O—) within the polymer chain.

The term "aliphatic" with respect to a polyester means that all carbon-carbon bonds in the polyester are single bonds.

The term "monomer unit" means a chemical group having a structure that appears at least twice in a polymer chain. A polymer may contain only one type of monomer unit, or it may contain two or more different monomer units.

The term "monomer" means a compound that can react with other monomers to form a polymer.

The term "hydrocarbon group" means a chemical group containing carbon and hydrogen.

The symbol α, and the symbol ω, are used to indicate end groups of a polymer.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
FIG. 1 depicts a method of making an aliphatic polyester.

The present invention makes use of the discovery that aliphatic polyesters that are substituted at the alpha- and beta-positions may exhibit desirable lubrication properties. The desirable lubrication properties may be maintained even at high temperatures and on chemically reactive surfaces. These aliphatic polyesters are polar, providing good adhesion to surfaces. In addition, these aliphatic polyesters have increased thermal, chemical and hydrolytic stability compared to conventional aliphatic polyesters. The aliphatic polyesters may be used as lubricant films in a variety of devices, including devices that operate at high speeds and elevated temperatures.

In one aspect, an aliphatic polyester includes monomer units of formula I:

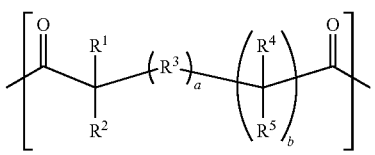

I and monomer units of formula II:

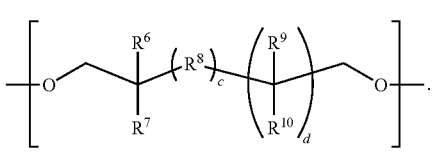

II

In formula I, $R^1$, $R^2$, $R^3$, $R^4$ and $R^5$ are independently hydrocarbon groups containing from 1 to 10 carbon atoms, a is 0 or 1, b is 0 or 1 when a is 0, and b is 1 when a is 1. In formula II, $R^6$, $R^7$, $R^8$, $R^9$ and $R^{10}$ are independently hydrocarbon groups containing from 1 to 10 carbon atoms, c is 0 or 1, d is 0 or 1 when c is 0, and d is 1 when c is 1.

In another aspect, an aliphatic polyester includes monomer units of formula II and monomer units of formula III:

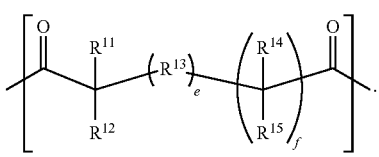

III

In formula III, $R^{11}$, $R^{12}$, $R^{13}$, $R^{14}$ and $R^{15}$ are independently hydrocarbon groups containing from 1 to 10 carbon atoms, e is 0 or 1, f is 0 or 1 when e is 0, and f is 1 when e is 1. When e is 1 and $R^{13}$ contains 2 or 3 carbon atoms, at least one of $R^{11}$ and $R^{14}$ contains from 2 to 10 carbon atoms.

An aliphatic polyester containing monomer units of formula I and monomer units of formula II may be represented by formula IV:

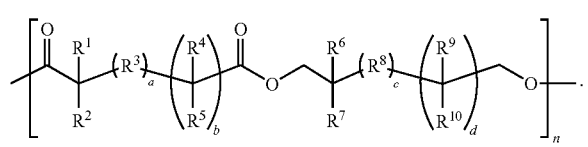

In formula IV, n may be an integer from 2 to 1,000. Also, $R^1$ to $R^{10}$ and a to d are as described for formulas I and II. Preferably n is an integer from 2 to 500, from 2 to 100, from 5 to 50, or from 10 to 30. The number of monomer units of formula I may be equal to the number of monomer units of formula II, or the monomer units may be present in different amounts. For example, the number of monomer units of formula I may be equal to the number of monomer units of formula II, plus or minus one. Preferably the number of monomer units of formula II is greater than the number of monomer units of formula I.

An aliphatic polyester containing monomer units of formula II and monomer units of formula III may be represented by formula V:

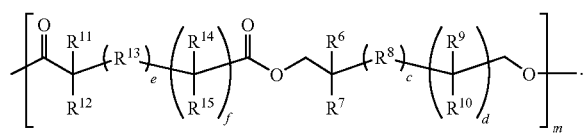

In formula V, m may be an integer from 2 to 1,000. Also, $R^6$ to $R^{15}$ and c to f are as described for formulas II and III. Preferably m is an integer from 2 to 500, from 2 to 100, from 5 to 50, or from 10 to 30. The number of monomer units of formula III may be equal to the number of monomer units of formula II, or the monomer units may be present in different amounts. For example, the number of monomer units of formula III may be equal to the number of monomer units of formula II, plus or minus one. Preferably the number of monomer units of formula II is greater than the number of monomer units of formula III.

Polyesters of formula IV and V also include copolymers containing more than one type of each monomer unit. A copolymer may include more than one type of monomer unit of formula I or III together with a single type of monomer unit of formula II. A copolymer may include a single type of monomer unit of formula I or III together with more than one type of monomer unit of formula II. A copolymer may include monomer units of both formula I and formula III, together with one or more types of monomer units of formula II. The total number of monomer units of formulas I and/or III may be equal to or different from the number of monomer units of formula II. For example, the total number of monomer units of formulas I and/or III may be equal to the number of monomer units of formula II, plus or minus one. Preferably the number of monomer units of formula II is greater than the total number of monomer units of formulas I and/or III.

In one example, a copolymer that includes two types of monomer units of formula I and two types of monomer units of formula II may be represented by formula VI:

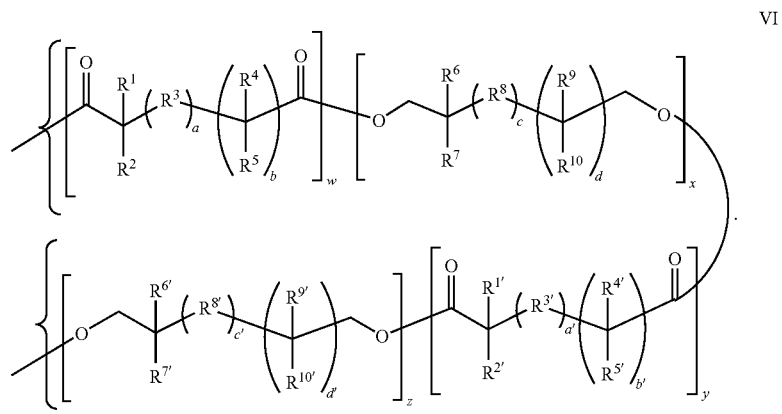

In formula VI, w, x, y and z independently may be integers from 2 to 1,000. Preferably w, x, y and z independently are integers from 2 to 500, from 2 to 100, from 5 to 50, or from 10 to 30. The value of (w+y) may be equal to or different from the value of (x+z). For example, (w+y) may be equal to (x+z), plus or minus one. Preferably (x+z) is greater than (w+y). Also, $R^1$ to $R^{10}$, a to d, $R^{1'}$ to $R^{10'}$ and a' to d' are as defined for $R^1$ to $R^{10}$ and a to d in formulas I and II.

Polyesters of formulas IV, V and VI include polyesters in which the number of monomer units of formula II in a polymer chain is one plus the number of monomer units of formula I and/or formula III in the polymer chain. In one example, a polyester of formula IV containing "n" monomer units of formula I and "n+1" monomer units of formula II may be represented by formula VII:

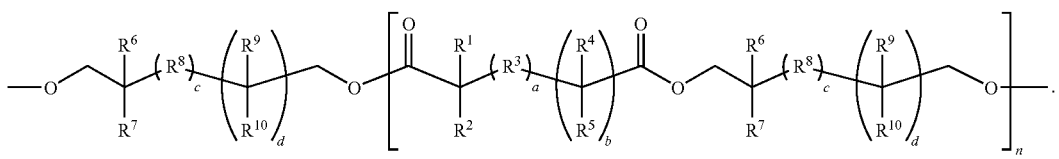

In formula VII, $R^1$ to $R^{10}$ and a to d are as described for formulas I and II, and n is as described for formula IV. Polyesters of formulas IV, V and VI also include polyesters in which the number of monomer units of formula II in a polymer chain is more than one plus the number of monomer units of formula I and/or formula III in the polymer chain. For example, chain branching may result in three or more chain ends, each of which may include a monomer unit of formula II.

Polymers of formulas IV through VII may include one or more end groups attached to the terminal elements of the polymer chains. For example, a polymer of formula VII may have an end group attached to each terminal oxygen atom, and this type of polymer may be represented by formula VIII:

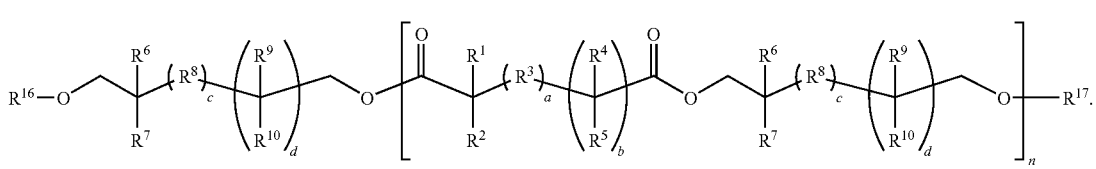

In formula VIII, the end groups $R^{16}$ and $R^{17}$ independently may be hydrogen, a hydrocarbon group containing from 1 to 10 carbon atoms, an acyl group of formula —C(=O)$R^{18}$ where $R^{18}$ is a hydrocarbon group containing from 1 to 10 carbon atoms, or a silane group of formula —Si($R^{19}$)$_3$ where $R^{19}$ is a hydrocarbon group containing from 1 to 10 carbon atoms. Also, $R^1$ to $R^{10}$ and a to d are as described for formulas I and II, and n is as described for formula IV.

These polyesters also may be described as copolymers including monomer units of formula II, monomer units of formula I and/or III, and monomer units of formula III':

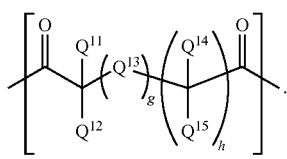

In formula III', $Q^{11}$ and $Q^{14}$ are ethyl groups; $Q^{12}$, $Q^{13}$ and $Q^{15}$ are independently hydrocarbon groups containing from 1 to 10 carbon atoms; g is 0 or 1, h is 0 or 1 when g is 0, and h is 1 when g is 1. A polyester may include monomer units of formula III' where $Q^{12}$ and $Q^{15}$ are methyl groups. A polyester may include monomer units of formula III' where g and h are 1, where $Q^{13}$ is a hydrocarbon group containing from 3 to 10 carbon atoms, and where $Q^{12}$ and $Q^{15}$ are methyl groups. A polyester may include monomer units of formula III' where g and h are 1, where $Q^{13}$ is a hydrocarbon group containing from 5 to 10 carbon atoms, and where $Q^{12}$ and $Q^{15}$ are methyl groups. A polyester may be a copolymer including monomer units of formula III' where g and h are 1, where $Q^{13}$ is a hydrocarbon group containing from 5 to 10 carbon atoms, and where $Q^{12}$ and $Q^{15}$ are methyl groups; and further including monomer units of formula III":

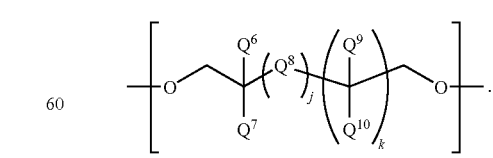

In formula III", $Q^{21}$ and $Q^{24}$ are ethyl groups, $Q^{22}$ and $Q^{25}$ are ethyl groups, and $Q^{23}$ is a hydrocarbon group containing from 3 to 10 carbon atoms. Preferably the number of monomer units of formula II in a polymer chain is greater than the number of monomer units of formulas I, III, III' and/or III" in the polymer chain.

These polyesters also may be described as copolymers including monomer units of formula I and/or formula III, monomer units of formula II, and monomer units of formula II':

II'

In formula II', $Q^6$ and $Q^9$ are methyl groups; $Q^7$, $Q^8$ and $Q^{10}$ are independently hydrocarbon groups containing from 1 to 10 carbon atoms; j is 0 or 1, k is 0 or 1 when j is 0, and k is 1 when j is 1. A polyester may include monomer units of formula II' where $Q^7$ and $Q^{10}$ are methyl groups. A polyester may include monomer units of formula II' where $Q^7$ and $Q^{10}$ are ethyl groups. A polyester may be a copolymer including monomer units of formula II' where $Q^7$ and $Q^{10}$ are ethyl groups; and further including monomer units of formula II":

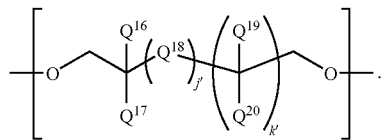

II"

In formula II", $Q^{16}$, $Q^{17}$, $Q^{19}$ and $Q^{20}$ are ethyl groups, $Q^{18}$ is a hydrocarbon group containing from 1 to 10 carbon atoms; j' is 0 or 1, k' is 0 or 1 when j' is 0, and k' is 1 when j' is 1. Preferably for a polyester copolymer j, k, j' and k' are zero. Preferably the total number of monomer units of formulas II, II' and/or II" in a polymer chain is greater than the total number of monomer units of formula I and/or formula III in the polymer chain.

Aliphatic polyesters such as those of formulas IV through VIII may be made by a variety of different methods. Polymerization methods for polyesters are described, for example in Stevens, Malcolm P.; *Polymer Chemistry: An Introduction, 3rd Edition*; New York: Oxford University Press, 1999, p. 338-363. Typical polymerization methods include the reaction of two different polymerizable groups. Examples of reactions of two different polymerizable groups include the direct esterification of acids with alcohols, the transesterification of esters with alcohols, the reaction of acyl chlorides with alcohols, the reaction of anhydrides with alcohols, the acidolysis of acids with esters, the reaction of acids with epoxides, the nucleophilic displacement of acids with halides, and the ring-opening of cyclic esters.

Aliphatic polyesters may be formed by polymerization of monomers that contain two different polymerizable groups in a single compound. For example, a single monomer may contain an acid group and an alcohol group, and polymerization can occur by direct esterification of these groups. In this example, the monomer units of formula II and of formula I or III may be included in a single monomer compound. A single monomer compound containing a monomer unit of formula I and a monomer unit of formula II, where the monomer compound may polymerize by direct esterification, may be represented by formula IX:

IX

In this formula, $R^1$ to $R^{10}$ and a to d are as described for formulas I and II.

Aliphatic polyesters may be formed by polymerization of two types of monomers that each contain two or more equivalents of a different type of polymerizable group. For example, a diacid may be combined with a diol to undergo polymerization by direct esterification. In this example, a diacid monomer containing the monomer unit of formula I may be represented by formula X, a diol monomer containing the monomer unit of formula II may be represented by formula XI, and a diacid monomer containing the monomer unit of formula III may be represented by formula XII:

X

XI

XII

In these formulas, $R^1$ to $R^{15}$ and a to f are as described for formulas I, II and III.

Examples of diacid monomers of formula X and of diol monomers of formula XI are listed in Table 1. Of these monomers, 2,6-diethyl-2,6-dimethylheptanedioic acid and 2,8-diethyl-2,8-dimethylnonanedioic acid are also consistent with formula XII.

TABLE 1

Exemplary Diacid and Diol Monomers

| Structure | Name | Formula |
|---|---|---|
|  | 2,2,5,5-tetramethyl-hexanedioic acid | X |
|  | 2,2,6,6-tetramethyl-heptanedioic acid | X |

TABLE 1-continued

Exemplary Diacid and Diol Monomers

| Structure | Name | Formula |
|---|---|---|
| | 2,6-diethyl-2,6-dimethyl-heptanedioic acid | X, XII |
| | 2,8-diethyl-2,8-dimethyl-nonanedioic acid | X, XII |
| | 2,2-diethyl-1,3-propanediol | XI |
| | 2-ethyl-2-methyl-1,3-propanediol | XI |

FIG. 1 represents a method 100 of making an aliphatic polyester that includes heating a reaction mixture to form an aliphatic polyester, the reaction mixture including a diacid monomer of formula XII and a diol monomer of formula XI 110, and optionally treating the aliphatic polyester with a monofunctional reagent 120. The reaction mixture may also include a monomer of formula X. The reaction mixture may contain more than one type of diacid monomer of formula X and/or formula XII, and/or more than one type of diol monomer of formula XI.

The reaction mixture may also include other ingredients. Examples of other ingredients include solvents, catalysts, accelerants, antioxidants, buffers, and viscosity modifiers. The monomers and one or more other ingredients may be combined simultaneously or in sequence. One or more of these other ingredients may be combined with the diacid monomer or the diol monomer prior to combining the two monomers. One or more of these ingredients may be added to the reaction mixture just prior to heating the reaction mixture. Preferably the reaction mixture contains the diacid and diol monomers and a catalyst. More preferably the reaction mixture contains the diacid and diol monomers, a catalyst, and an antioxidant. An example of a catalyst is $SbO_3$. An example of an antioxidant is triphenyl phosphate.

The heating the reaction mixture to form an aliphatic polyester 110 may be performed at a temperature and for a time sufficient to convert all of the diacid and/or diol monomers into monomer units in a polyester. Because the monomers of formulas X, XI and XII are substituted near the acid and alcohol functional groups, higher temperatures and longer polymerization times than are used for other aliphatic polyesters may be required to produce polyesters of the desired molecular weight. The polymerization temperature and polymerization time may be affected by whether the reaction mixture contains one or more of the other ingredients described above. For example, the polymerization may be performed neat or in the presence of a solvent. The presence of a catalyst or accelerant in the reaction mixture may provide for lower temperatures and/or shorter polymerization times.

The treating the aliphatic polyester with a monofunctional reagent 120 may include adding to the reaction mixture a monofunctional reagent that can react with any remaining acid or alcohol groups. Examples of monofunctional reagents include alcohols, carboxylic acids, alkyl halides, acyl halides, and silyl halides. The treating may further include isolating, and optionally purifying, the aliphatic polyester after heating the reaction mixture 110.

Preferably the treating the aliphatic polyester with a monofunctional reagent results in the formation of relatively unreactive end groups at the chain ends of the aliphatic polyester. If one type of monomer was present in the reaction mixture in excess, then a single type of monofunctional reagent may be used, since there may be only one type of polymerizable group still available after the heating the reaction mixture 110. Preferably the reaction mixture contains the diol monomer in a 1 mole percent (mol %) to 50 mol % excess over the diacid monomer. More preferably the reaction mixture contains the diol monomer in a 5 mol % to 40 mol % excess over the diacid monomer, and more preferably in a 10 mol % to 30 mol % excess over the diacid monomer. The presence of an excess of diol monomers typically produces polymer chains having monomer units derived from the diol monomers at each end of the chains.

For a reaction mixture that includes a diacid monomer of formula XII, the reaction mixture preferably includes at least one monomer of formula XII':

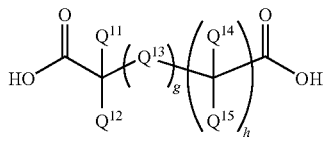

XII' where $Q^{11}$ to $Q^{15}$, g and h are as described for formula III'. The reaction mixture may also include at least one monomer of formula XII":

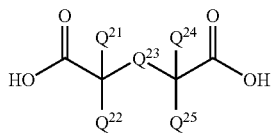

XII"

where $Q^{21}$ to $Q^{25}$ are as described for formula III".

For a reaction mixture that includes a diol monomer of formula XI, the reaction mixture preferably includes at least one monomer of formula XI':

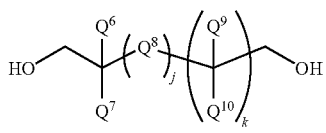

XI' where $Q^6$ to $Q^{10}$, j and k are as described for formula II'. The reaction mixture may also include at least one monomer of formula XI":

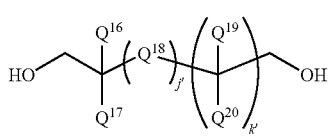

XI"

where $Q^{16}$ to $Q^{20}$, j' and k' are as described for formula II".

Aliphatic polyesters formed by the method 100 may include monomer units of formula II (including formulas II' and/or II"), and monomer units of formula III (including formulas III' and III"), and optionally may include monomer units of formula I. Table 2 lists examples of monomer units that are consistent with these formulas. These monomer units may be derived from the monomers listed in Table 1. However, as noted above aliphatic polyesters can be formed using a variety of different types of monomers, and the monomer units in Table 2 may be derived from monomers other than diacid and diol monomers, including from single monomer compounds.

TABLE 2

Exemplary Aliphatic Polyester Monomer Units

| Structure | Name | Formula |
|---|---|---|
|  | 1,6-dicarbonyl-2,2,5,5-tetramethyl-hexane | I |
|  | 1,7-dicarbonyl-2,2,6,6-tetramethyl-heptane | I |
|  | 1,7-dicarbonyl-2,6-diethyl-2,6-dimethyl-heptane | I, III |
|  | 1,9-dicarbonyl-2,8-diethyl-2,8-dimethyl-nonane | I, III |
|  | 1,3-dioxo-2,2-diethyl-propane | II |
|  | 1,3-dioxo-2-methyl-2-ethyl-propane | II |

A method of lubricating a surface includes coating the surface with an aliphatic polyester or a lubricant containing the aliphatic polyester. A wide variety of surfaces may be lubricated by this method, including bearing surfaces, gear surfaces, surfaces of moving parts in motors, and magnetic disk surfaces. In one example, a motor may include an aliphatic polyester or a lubricant containing the aliphatic polyester as a lubricant for the moving parts in the motor. For example, fractional horse power (FHP) motors may benefit from lubrication with aliphatic polyesters.

A surface may be coated with an aliphatic polyester using a variety of techniques. Examples of coating techniques include spin coating, dip coating, dropwise deposition, and spraying. It may be desirable to dissolve or disperse the aliphatic polyester in a solvent, and then to use this mixture to coat the surface. The solvent may be removed by evaporation and/or drying to leave a coating of the aliphatic polyester. A lubricant containing an aliphatic polyester may contain other ingredients, such as solvents, carriers, stabilizers, viscosity modifiers, and anti-wear additives.

Preferably the aliphatic polyester is substituted at the alpha- and beta-positions. More preferably the aliphatic polyester is a polyester of formulas IV, V, VI, VII or VIII. Aliphatic polyesters substituted at the alpha- and beta-positions may have improved properties relative to conventional lubricants, including stronger adhesion to the surface, a lower coefficient of static friction, and increased thermal, chemical and hydrolytic stability. These improved properties may be obtained without any deterioration in other desirable lubricant properties, such as low surface energy and a low coefficient of dynamic friction.

With respect to thermal stability, a sample of the aliphatic polyester $\alpha,\omega$-bis-trimethylacetyl-poly[(1,3-dioxo-2,2-diethylpropane)-co-(1,7-dicarbonyl-2,6-diethyl-2,6-dimethylheptane)-co-(1,3-dioxo-2-methyl-2-ethylpropane)-co-(1,9-dicarbonyl-2,8-diethyl-2,8-dimethylnonane)] lost only 20 percent of its weight when heated in an air atmosphere at 180° C. for 27 hours. In contrast, conventional non-aromatic perfluoroether lubricants typically degrade and volatilize completely after being heated for 10 minutes at 190° C.

With respect to hydrolytic stability, samples of aliphatic polyesters substituted at the alpha- and beta-positions that were refluxed in alkaline solutions experienced reductions in their molecular weights of from 5% to 21%. In contrast, conventional perfluoroether lubricants typically undergo complete hydrolytic degradation under the same test conditions.

One possible explanation for the improved stability properties in the aliphatic polyesters is that the presence of a substituent at the beta-position blocks the typical mechanism of thermal degradation by beta-hydrogen elimination. In addition, the presence of a substituent at the alpha-position may block the typical mechanism of hydrolysis.

With respect to static friction, a 3 nanometer (nm) thick film of the aliphatic polyester $\alpha,\omega$-bis-trimethylacetyl-poly[(1,3-dioxo-2,2-diethylpropane)-co-(1,6-dicarbonyl-2,2,5,5-tetramethylhexane)-co-(1,3-dioxo-2-methyl-2-ethylpropane)-co-(1,7-dicarbonyl-2,2,6,6-tetramethylheptane)] had static coefficients of friction of 0.89, 0.49, 0.46, and 0.39 for normal loads of 10 lb, 15 lb, 20 lb and 30 lb, respectively. The static coefficient of friction for a 15 lb normal load decreased as the film thickness decreased, indicating that the polyester may have a static friction less than 0.49 at thicknesses less than 3 nm. In contrast, conventional perfluoroether lubricant films with a thickness of 1-1.5 nm still have a static coefficient of friction of 0.5 with a 2-4 gram normal load. This is a higher static coefficient of friction than that of the polyester film at twice the thickness.

In addition, 1 nm thick films of the aliphatic polyesters $\alpha,\omega$-bis-trimethylacetyl-poly[(1,3-dioxo-2,2-diethylpropane)-co-(1,7-dicarbonyl-2,2,6,6-tetramethylheptane)-co-(1,3-dioxo-2-methyl-2-ethylpropane)] and $\alpha,\omega$-bis-trimethylacetyl-poly[(1,3-dioxo-2,2-diethylpropane)-co-(1,7-dicarbonyl-2,6-diethyl-2,6-dimethylheptane)-co-(1,3-dioxo-2-methyl-2-ethylpropane)] had static coefficients of friction of 0.3 and 0.4, respectively when measured with a normal load of 1.5 grams at a fly speed of 3500 rpm. In contrast, a 1 nm thick PFPE film had a static coefficient of friction of 1.5 under the same conditions.

Aliphatic polyesters having these improved lubricant properties may have surface energies that are comparable to those of conventional perfluoroether lubricants. For example, aliphatic polyesters substituted at the alpha- and beta-positions may have surface energies of from 19 to 28 milliNewtons per meter (mN/m), which overlaps the typical range of surface energies for perfluoroether lubricants (15-20 mN/m). A lower surface energy value for a lubricant correlates with a more complete coating of the surface.

Aliphatic polyesters having these improved lubricant properties also may have dynamic coefficient of friction values that are comparable to those of conventional perfluoroether lubricants. For example, aliphatic polyesters substituted at the alpha- and beta-positions may have dynamic coefficient of friction values of from 0.14 to 0.33 for thin films subjected to a 15 pound (lb) normal load. These values are within the range of dynamic coefficient of friction values for perfluoroether lubricants (0.25-0.40).

One possible explanation for the maintenance or improvement of the lubrication properties in the aliphatic polyesters is that the steric bulk of the substituents decreases the degree of microcrystallinity in the polyester. The presence of different substituents within the same polymer chain also may tend to inhibit the polymer chains from orienting into microcrystalline domains. This inhibition of crystallinity may permit the polyester to be more fluid when present as a lubricant. In addition, the polyesters may form monolayer films that are tightly bound to a substrate, resulting in lower static friction. For example, the polar ester groups may have strong interactions with a carbon overcoat on a hard disk surface. If a portion of the polyester film was displaced, these interactions can help to replenish the lubricant film. In the context of a hard disk drive, a tightly bound lubricant can minimize or eliminate the tendency of the read-write head to sink into the lubricant layer.

A method of lubricating a hard disk drive includes coating the surface of a magnetic disk with an aliphatic polyester. A hard disk drive lubricated with an aliphatic polyester may include one or more magnetic disks, each disk having a lubricant film on the surface of the disk, where the lubricant film includes a polyester containing monomer units of formula I and monomer units of formula II. The polyester may contain monomer units of formula III and monomer units of formula II. The polyester may be a polyester of formulas IV through VIII. The lubricant film may have a thickness from 1 to 5 nm.

The following examples are provided to illustrate one or more preferred embodiments of the invention. Numerous variations may be made to the following examples that lie within the scope of the invention.

EXAMPLES

Example 1

Synthesis of 2,2,6,6-Tetramethylheptanedioic Acid

Lithium diisopropylamide (444.2 mL of a 2.0 M solution in heptane/tetrahydrofuran/ethylbenzene, ALDRICH, Milwaukee, Wis.) and 250 mL of dry hexane were charged into a 1000 mL 3-neck flask at 0° C. under dry nitrogen. Isobutyric acid (37.00 g, ALDRICH) was added dropwise to the solution while stirring over a period of 30 min. To this mixture, 1,3-dibromopropane (40.38 g, ALDRICH) was added dropwise. White crystals appeared in the mixture, which dissolved upon warming to room temperature. The mixture was stirred for 30 min at 0° C. and then for one hour at 35° C. Ice water (600 mL) was added to the mixture, and the layers were separated. The organic layer was washed once more with water. The combined water layers were acidified to a pH of 2 and then extracted three times with chloroform. The chloroform layers were washed once with a NaCl-saturated water solution, and then dried with sodium sulfate. Evaporation of the solvent yielded 31.59 g (73%) of 2,2,6,6-tetramethylheptanedioic acid. The product was further purified through recrystallization from acetone/water (1:1).

Example 2

Synthesis of 2,6-diethyl-2,6-Dimethylheptanedioic Acid

Lithium diisopropylamide (444.2 mL of a 2.0 M solution in heptane/tetrahydrofuran/ethylbenzene, ALDRICH, Milwaukee, Wis.) and 250 mL of dry hexane were charged into a 1000 mL 3-neck flask at 0° C. under dry nitrogen. 2-Methylbutyric acid (42.88 g, ALDRICH) was added dropwise to the solution while stirring over a period of 30 min. To this mixture, 1,3-dibromopropane (40.38 g, ALDRICH) was added dropwise. White crystals appeared in the mixture, which dissolved upon warming to room temperature. The mixture was stirred for 30 min at 0° C. and then for one hour at 35° C. Ice water (600 mL) was added to the mixture, and the layers were separated. The organic layer was washed once more with water. The combined water layers were acidified to a pH of 2 and then extracted three times with chloroform. The chloroform layers were washed once with a NaCl-saturated water solution, and then dried with sodium sulfate. Evaporation of the solvent yielded 41.29 g (84.6%) of 2,6-diethyl-2,6-dimethylheptanedioic acid. The product was further purified through recrystallization from acetone/water (1:1).

Example 3

Synthesis of 2,8-diethyl-2,8-Dimethylnonanedioic Acid

Lithium diisopropylamide (444.2 mL of a 2.0 M solution in heptane/tetrahydrofuran/ethylbenzene, ALDRICH, Milwaukee, Wis.) and 250 mL of dry hexane were charged into a 1000 mL 3-neck flask at 0° C. under dry nitrogen. 2-Methylbutyric acid (42.88 g, ALDRICH) was added dropwise to the solution while stirring over a period of 30 min. To this mixture, 1,5-dibromopentane (45.98 g, ALDRICH) was added dropwise. White crystals appeared in the mixture, which dissolved upon warming to room temperature. The mixture was stirred for 30 min at 0° C. and then for one hour at 35° C. Ice water (600 mL) was added to the mixture, and the layers were separated. The organic layer was washed once more with water. The combined water layers were acidified to a pH of 2 and then extracted three times with chloroform. The chloroform layers were washed once with a NaCl-saturated water solution, and then dried with sodium sulfate. Evaporation of the solvent yielded 40.39 g (74%) of 2,8-diethyl-2,8-dimethylnonanedioic acid. The product was further purified through recrystallization from acetone/water (1:1).

Example 4

Synthesis of Poly[(1,3-dioxo-2,2-diethylpropane)-co-(1,6-dicarbonyl-2,2,5,5-tetramethylhexane)-co-(1,3-dioxo-2-methyl-2-ethylpropane)-co-(1,7-dicarbonyl-2,2,6,6-tetramethylheptane)]

A mixture of 2,2,5,5,-tetramethylhexanedioic acid (9.35 g, 46.24 mmol, ALDRICH), 2,2,6,6,-tetramethylheptanedioic acid (Example 1, 20.00 g, 92.47 mmol), 2,2,-diethyl-1,3-propanediol (11.92, 90.16 mmol, ALDRICH), 2-ethyl-2-methyl-1,3-propanediol (10.66 g, 90.16 mmol, ALDRICH), $Sb_2O_3$ (0.5 g, ALDRICH) and triphenyl phosphite (0.25 g, ALDRICH) was prepared by addition of the ingredients at room temperature to a 250 mL 3-neck flask equipped with a mechanical stirrer, nitrogen gas inlet tube, and cold water condenser. The diols were present in a 30 mol % excess relative to the diacids. The mixture was stirred under argon while being heated to 180° C. at atmospheric pressure. Heat was supplied with an oil bath and controlled with a temperature controller. The temperature was held for 15 hr and then raised to 190° C. for 26 hr. The reaction was monitored by FTIR (ester 1731 $cm^{-1}$; carboxylic acid 1701 $cm^{-1}$). To complete the reaction, the pressure was decreased with an aspiration pump to about 15 mm over 1.5 hr, and then to about 1 mm with a vacuum pump over 1.5 hr. The mixture was cooled to room temperature under argon. The resulting viscous polyesters were dissolved in chloroform and filtered to remove the $Sb_2O_3$. The solvent was evaporated, and the transparent polymer was dried under vacuum at 80° C.

Example 5

Synthesis of α,ω-Bis-trimethylacetyl-Poly[(1,3-dioxo-2,2-diethylpropane)-co-(1,6-dicarbonyl-2,2,5,5-tetramethylhexane)-co-(1,3-dioxo-2-methyl-2-ethylpropane)-co-(1,7-dicarbonyl-2,2,6,6-tetramethylheptane)]

A solution of poly[(1,3-dioxo-2,2-diethylpropane)-co-(1,6-dicarbonyl-2,2,5,5-tetramethyl hexane)-co-(1,3-dioxo-2-methyl-2-ethylpropane)-co-(1,7,-dicarbonyl-2,2,6,6-tetramethylheptane)] (Example 4, 6.83 g) in 200 mL absolute chloroform (ALDRICH) and absolute pyridine (2.77 g, 35 mmol, ALDRICH) was cooled to 5° C. A solution of trimethylacetyl chloride (3.62 g, 30 mmol, ALDRICH) in 100 mL absolute chloroform was added dropwise, and the mixture was stirred for 1.5 hr before warming to room temperature over the period of an hour. The mixture was refluxed for 2 hr and then cooled to room temperature. The pyridinium chloride was filtered off, and 300 mL of a 5% HCl solution was added to the reaction mixture. The organic layer was washed three times with water until it was acid free. The organic layer was then dried with sodium sulfate, distilled, and vacuum dried at 80° C.

Example 6

Synthesis of Poly[(1,3-dioxo-2,2-diethylpropane)-co-(1,7-dicarbonyl-2,2,6,6-tetramethylheptane)-co-(1,3-dioxo-2-methyl-2-ethylpropane)]

A polyester copolymer was synthesized as described in Example 4, except using only one type of diacid monomer -2,2,6,6,-tetramethylheptanedioic acid (Example 1, 32.46 g, 150.26 mmol). After drying under vacuum at 70° C., the product was a transparent, viscous polymer.

Example 7

Synthesis of α,ω-Bis-trimethylacetyl-Poly[(1,3-dioxo-2,2-diethylpropane)-co-(1,7-dicarbonyl-2,2,6,6-tetramethylheptane)-co-(1,3-dioxo-2-methyl-2-ethyl propane)]

An end-capped polyester copolymer was synthesized as described in Example 5, except using the polyester of Example 6, poly[(1,3-dioxo-2,2-diethylpropane)-co-(1,7-dicarbonyl-2,2,6,6-tetramethylheptane)-co-(1,3-dioxo-2-methyl-2-ethylpropane)]. The product was then distilled and vacuum dried at 80° C.

Example 8

Synthesis of Poly[(1,3-dioxo-2,2-diethylpropane)-co-(1,7-dicarbonyl-2,6-diethyl-2,6-dimethylheptane)-co-(1,3-dioxo-2-methyl-2-ethylpropane)]

A polyester copolymer was synthesized as described in Example 4, except using only one type of diacid monomer -2,6-diethyl-2,6-dimethylheptanedioic acid (Example 2, 36.60 g, 150.26 mmol). The product was a transparent, viscous polymer.

Example 9

Synthesis of α,ω-Bis-trimethylacetyl-Poly[(1,3-dioxo-2,2-diethylpropane)-co-(1,7-dicarbonyl-2,6-diethyl-2,6-dimethylheptane)-co-(1,3-dioxo-2-methyl-2-ethylpropane)]

An end-capped polyester copolymer was synthesized as described in Example 5, except using the polyester of Example 8, poly[(1,3-dioxo-2,2-diethylpropane)-co-(1,7-dicarbonyl-2,6-diethyl-2,6-dimethylheptane)-co-(1,3-dioxo-2-methyl-2-ethylpropane)]. The product was then distilled and vacuum dried at 80° C.

Example 10

Synthesis of Poly[(1,3-dioxo-2,2-diethylpropane)-co-(1,7-dicarbonyl-2,6-diethyl-2,6-dimethylheptane)-co-(1,3-dioxo-2-methyl-2-ethylpropane)-co-(1,9-dicarbonyl-2,8-diethyl-2,8-dimethylnonane)]

A polyester copolymer was synthesized as described in Example 4, except using different diacid monomers -2,8-diethyl-2,8-dimethylnonanedioic acid (Example 3, 20.44 g, 75.13 mmol) and 2,6-diethyl-2,6-dimethylheptanedioic acid (Example 2, 18.33 g, 75.13 mmol). The product was a transparent, viscous polymer.

Example 11

Synthesis of α,ω-Bis-trimethylacetyl-Poly[(1,3-dioxo-2,2-diethylpropane)-co-(1,7-dicarbonyl-2,6-diethyl-2,6-dimethylheptane)-co-(1,3-dioxo-2-methyl-2-ethylpropane)-co-(1,9-dicarbonyl-2,8-diethyl-2,8-dimethylnonane)]

An end-capped polyester copolymer was synthesized as described in Example 5, except using the polyester of Example 10, poly[(1,3-dioxo-2,2-diethylpropane)-co-(1,7-dicarbonyl-2,6-diethyl-2,6-dimethylheptane)-co-(1,3-dioxo-2-methyl-2-ethylpropane)-co-(1,8-dicarbonyl-2,8-diethyl-2,8-dimethylnonane)]. The product was then distilled and vacuum dried.

Example 12

Thermal Analysis of Polyesters

Glass transition temperatures ($T_g$) and crystalline melting temperatures ($T_m$) of the polyesters of Examples 5, 7 and 9 were measured by differential scanning calorimetry (DSC), using a Mettler Toledo Star System at a heating rate of 10° C./min. Sample weights between 5 and 10 mg were used, and all scans were run under dry nitrogen using a flow rate of 60 mL/min. The transition temperatures were taken at the maxima of the endothermic peaks. The $T_g$ and $T_m$ values measured were:

Example 5 polyester: $T_g$=−25.9° C.; $T_m$=46.1° C.
Example 7 polyester: $T_g$=−34.3° C.; $T_m$=53.5° C.
Example 9 polyester: $T_g$=−35.4° C.; $T_m$=51.6° C.
Example 11 polyester: $T_g$=−38.7° C.; $T_m$=na The polyesters of Examples 7, 9 and 11 were more sterically hindered than the polyester of Example 5. This increase in steric hindrance corresponded to a decrease in the $T_g$. The polyester of Example 11 was more asymmetric than the polyester of Examples 7 and 9, since two types of monomer units derived from diacids were present in the polyester of Example 11. This asymmetry correlated to a further lowering of the $T_g$ and an elimination of a measurable $T_m$.

Figure 2:
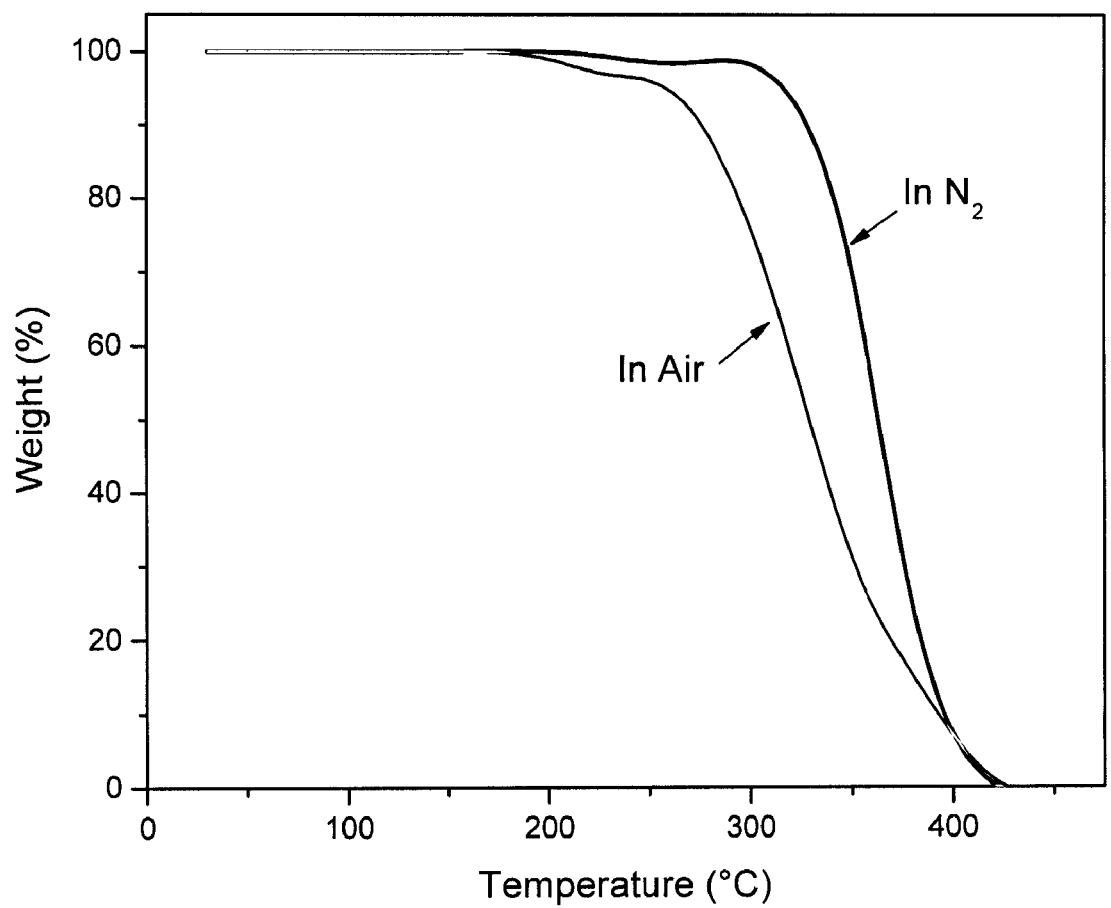
FIG. 2 is a graph of sample weight loss as a function of temperature increase for an aliphatic polyester.

Thermal and oxidative stabilities of the polyesters were measured using thermal gravimetric analysis (TGA), using a TA Instruments TGA 2950. Dynamic measurements were conducted at a heating rate of 10° C./min. Isothermal measurements were conducted at 210° C., 180° C./150° C. or 100° C. for 30 hours. The samples were heated under a constant stream (100 mL/min) of either air or nitrogen. FIG. 2 is a graph of sample weight loss as a function of temperature increase for the polyester of Example 7. For the nitrogen atmosphere, there was almost no weight loss up to 200° C., and less than a 6% weight loss up to 300° C. For the air atmosphere, there was almost no weight loss up to 200° C., and less than 10% weight loss up to 300° C.

Figure 3:
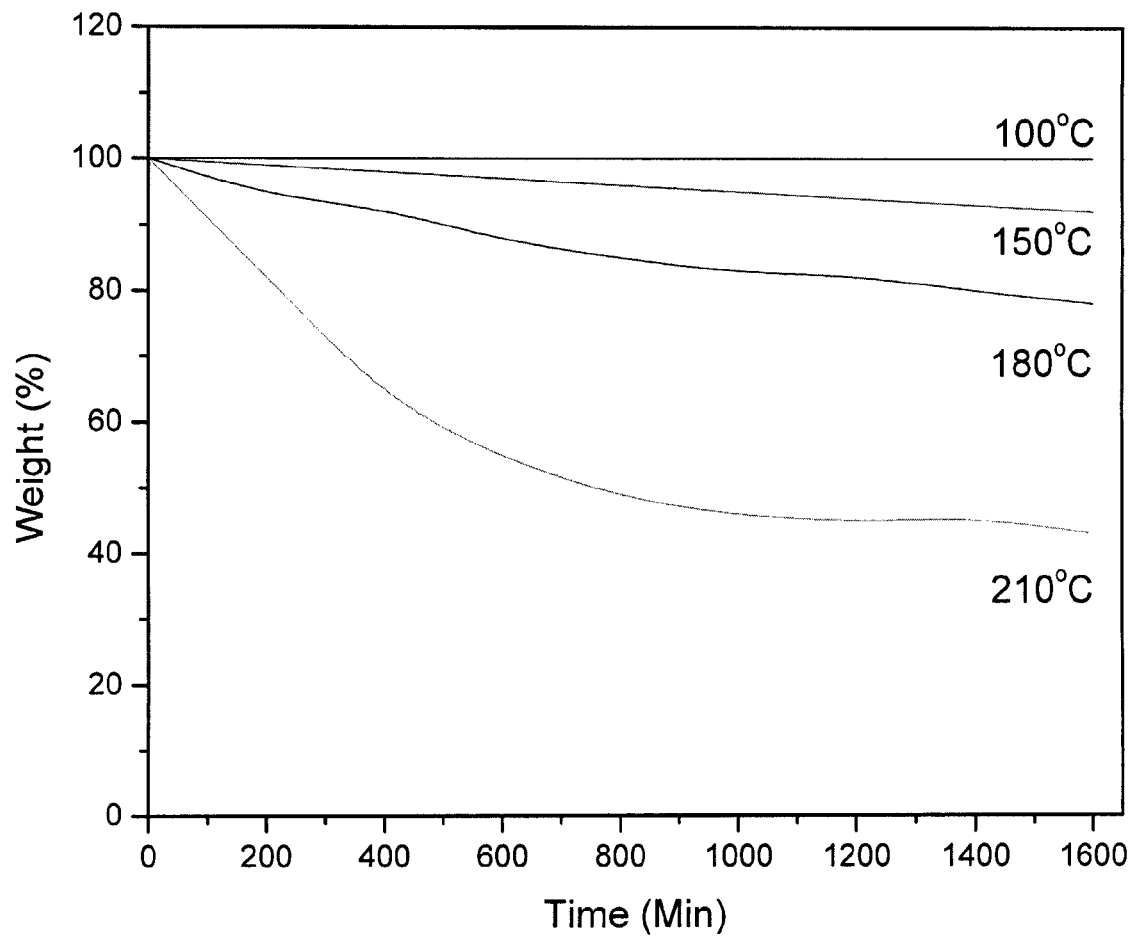
FIG. 3 is a graph of sample weight loss as a function of time at various temperatures for an aliphatic polyester.

FIG. 3 is a graph of sample weight loss as a function of time at various temperatures in an air atmosphere for the polyester of Example 11. The polyester was heated at 30° C. for 30 minutes, and was then heated at a rate of 10° C./min to one of the indicted temperatures. A 20% weight loss occurred after heating at 180° C. for 27 hours. In comparison, non-aromatic perfluoroether lubricants typically undergo 100% weight loss after 10 minutes at 190° C.

Example 13

Hydrolytic Stability Analysis of Polyesters

The hydrolytic stabilities of the polyesters of Examples 7, 9 and 11 were examined by measurement of the saponification number for each polymer. A sample was refluxed for 30 minutes in 0.5 N alcoholic KOH, and the molecular weight of the polymer was then analyzed by gel permeation chromatography (GPC). The GPC analysis was carried out using a Waters Model 410 instrument with a 500 A Ultrastyragel column, using THF as the solvent at 40° C. at a flow rate of 1 mL/min. Poly(proplyene glycol) standards were used to calibrate the GPC instrument. The molecular weights of the polyesters of Examples 7, 9 and 11 were reduced by 20.7%, 5.7% and 4.9%, respectively. In comparison, conventional aliphatic polyesters typically undergo complete degradation under these test conditions.

Example 14

Formation of Polyester Films

Thin films of the polyesters of Examples 5, 7, 9 and 11 were prepared by spin coating, dip coating, or dropwise addition of THF solutions, followed by evaporation of the solvent. The films were vacuum dried at 70° C. to ensure complete removal of THF. Dropwise coating tended to allow the thinnest and most uniform films. Films ranging from 40 micrometers (μm)

to 20 angstroms (Å) were made on highly polished aluminum hard drive substrates, on glass slides, and on silicon wafers. The thinnest films may have been less uniform, as the root-mean-square (RMS) roughness of the polished aluminum was greater than the film thickness.

Example 15

Surface Energy Measurements of Polyester Films

Surface energies of the polyester films as formed in Example 14 were measured using a contact angle goniometer apparatus. Water droplets were placed on each film surface, and the advancing, receding and sessile contact angles were measured. Table 3 lists the measured surface energies for films of the polyester of Example 5 on different substrates. The surface energies are comparable to those of PFPE's.

TABLE 3

Surface Energies of Polyester Films

| Substrate | Film Thickness (Å) | $\gamma_{SG} - \gamma_{SI}$ (mN/m) |
|---|---|---|
| Al | 25 | 28 |
| Glass | 20 | 19 |
| Si | 20 | 25 |

Example 16

Friction Coefficient Measurements of Polyester Films

The static and dynamic friction coefficients of the polyester films as formed in Example 14 were measured using a pin-on-disk tribometer. Pins of $Al_2O_3$ were placed on polyester films of various thicknesses on polished aluminum hard drive substrates. A wear-track diameter of 2.5 cm was used, with normal loads of 10-30 pounds (lb). The disk was then rotated at a fly speed of 250 rpm. Prior to each run, the specimens were allowed to equilibrate for five minutes to allow the pin to sink fully into the lubricant layer. Static coefficient of friction was tested by starting the machine and taking 1600 measurements in the initial 0.2 seconds of the test. A characteristic force-versus-time curve was generated for each test. Each curve featured a sharp initial peak followed by a decrease to a generally level line. The peak value was taken as the static coefficient of friction, and the level value was taken as the dynamic coefficient of friction.

Figure 4:
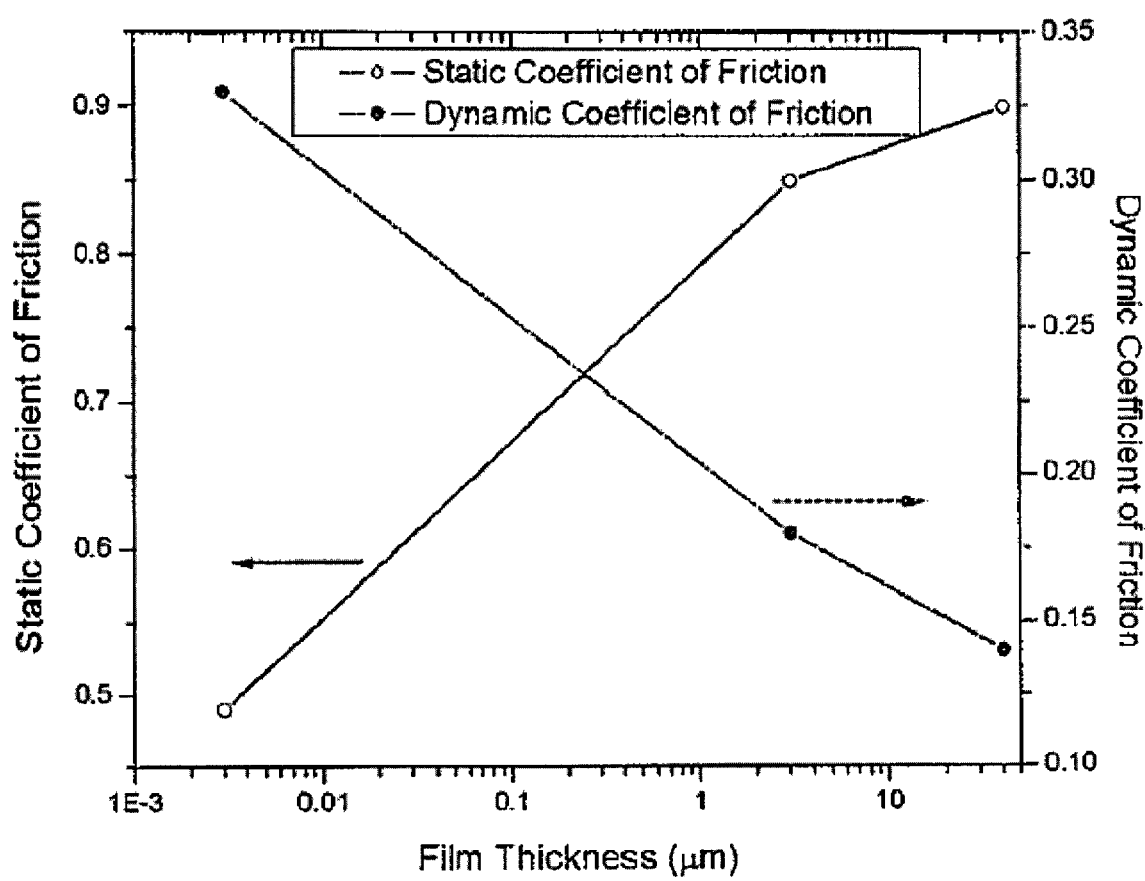
FIG. 4 is a graph of the static coefficient of friction and the dynamic coefficient of friction as a function of film thickness of an aliphatic polyester.

For films of the polyester of Example 5 having a thickness of 3 nanometers (nm), the static coefficient of friction for normal loads of 10 lb, 15 lb, 20 lb and 30 lb were 0.89, 0.49, 0.46, and 0.39, respectively. Films of this polyester were also analyzed for static and dynamic friction at different film thicknesses. FIG. 4 is a graph of the static coefficient of friction and the dynamic coefficient of friction as a function of film thickness for a 15 lb normal load. Static coefficient of friction decreased as the film thickness decreased, indicating that the polyester may have lower static friction at thicknesses less than 3 nm. Typical PFPE hard disk drive lubricant films have a thickness from 1 to 1.5 nm; however, these conventional films still have a static coefficient of friction of 0.5 with a 2-4 gram normal load, which is higher than that of the polyester films at twice the thickness. Dynamic coefficient of friction increased as the film thickness decreased. At a film thickness of 3 nm, the dynamic coefficient of friction of the polyester (0.33) was comparable to that of conventional PFPE lubricants (0.25-0.40).

Example 17

Friction Measurements of Polyester and PFPE Films

Friction coefficients were measured for polyester films and for Fomblin® Z-DOL 4000 PFPE (Solvay Solexis). The polyesters of Examples 7 and 9 and the PFPE were each coated onto magnetic disk surfaces by dip-coating in a class-100 clean room environment. Unlubricated magnetic disks protected with amorphous carbon overcoats were cleaned for 5 minutes with an ultrasonic cleaner in acetone and then for 5 minutes with hydrofluoroether solvent (NOVEC HFE-7100DL, 3M, St. Paul, Minn.) for 5 min. The disks were dipped into a 0.10-0.35 volume percent (vol %) solution of the polymer in HFE-7100DL at a constant speed of 1 mm/s, and then withdrawn from the solution at the same speed. No heat treatment or annealing was used.

The static and dynamic friction coefficients were measured using a pin-on-disk tribometer. The normal load was 1.5 grams, and the disk was rotated at a fly speed of 3500 rpm. The data was collected and analyzed using similar methods to those of Example 16. For films of the polyesters of Examples 7 and 9 having thicknesses of 1 nm, the static coefficients of friction were 0.53 and 0.9, respectively. The dynamic coefficients of friction were 0.3 and 0.4, respectively. In contrast, the PFPE film had a static coefficient of friction of 1.5 and a dynamic coefficient of friction of 0.4.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A lubricant, comprising an aliphatic polyester, comprising:

monomer units of formula III

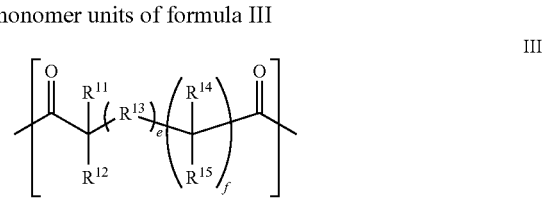

where $R^{11}$, $R^{12}$, $R^{13}$, $R^{14}$ and $R^{15}$ are independently hydrocarbon groups containing from 1 to 10 carbon atoms,
e is 0 or 1,
f is 0 or 1 when e is 0, and
f is 1 when e is 1;
where, when e is 1 and $R^{13}$ contains 2 or 3 carbon atoms, at least one of $R^{11}$ and $R^{14}$ contains from 2 to 10 carbon atoms; and monomer units of formula II

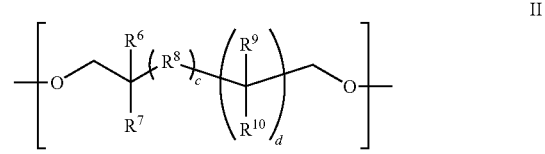

where $R^6$, $R^7$, $R^8$, $R^9$ and $R^{10}$ are independently hydrocarbon groups containing from 1 to 10 carbon atoms,
c is 0 or 1,
d is 0 or 1 when c is 0, and
d is 1 when c is 1, where the polyester further comprises monomer units of formula III′

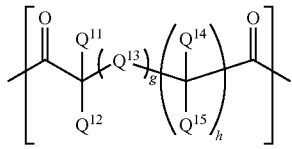

III′ where $Q^{11}$ and $Q^{14}$ are ethyl groups,
$Q^{12}$, $Q^{13}$ and $Q^{15}$ are independently hydrocarbon groups containing from 1 to 10 carbon atoms,
g is 0 or 1,
h is 0 or 1 when g is 0, and
h is 1 when g is 1.

2. The lubricant of claim 1, where $Q^{12}$ and $Q^{15}$ are methyl groups.

3. The lubricant of claim 2, where g and h are 1, and $Q^{13}$ is a hydrocarbon group containing from 3 to 10 carbon atoms.

4. The lubricant of claim 2, where g and h are 1, and $Q^{13}$ is a hydrocarbon group containing from 5 to 10 carbon atoms.

5. The lubricant of claim 4, further comprising monomer units of formula III″

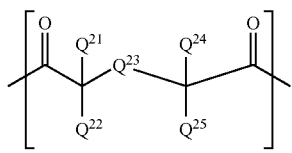

III″ where $Q^{21}$ and $Q^{24}$ are ethyl groups,
$Q^{22}$ and $Q^{25}$ are ethyl groups, and
$Q^{23}$ is a hydrocarbon group containing from 3 to 10 carbon atoms.

6. A method of lubricating a surface, comprising:
coating the surface with the lubricant of claim 1.

7. A hard disk drive, comprising:
a magnetic disk, and
a film of the lubricant of claim 1 on the disk surface.

8. The lubricant of claim 1, where the average number of monomer units of formula III in a polymer chain is from 2 to 1,000.

9. The lubricant of claim 1, further comprising monomer units of formula I

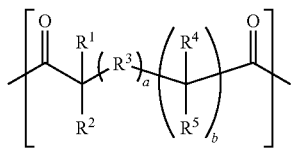

I where $R^1$, $R^2$, $R^3$, $R^4$ and $R^5$ are independently hydrocarbon groups containing from 1 to 10 carbon atoms, a is 0 or 1, b is 0 or 1 when a is 0, and b is 1 when a is 1.

10. A hard disk drive, comprising:
a magnetic disk, and
a lubricant film on the disk surface;
the lubricant film comprising an aliphatic polyester comprising monomer units of formula I

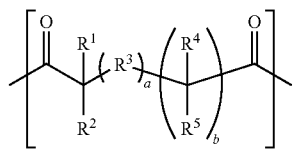

I where $R^1$, $R^2$, $R^3$, $R^4$ and $R^5$ are independently hydrocarbon groups containing from 1 to 10 carbon atoms, a is 0 or 1, b is 0 or 1 when a is 0, and b is 1 when a is 1; and monomer units of formula II

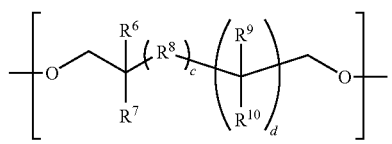

II where $R^6$, $R^7$, $R^8$, $R^9$ and $R^{10}$ are independently hydrocarbon groups containing from 1 to 10 carbon atoms, c is 0 or 1, d is 0 or 1 when c is 0, and d is 1 when c is 1, where the polyester further comprises monomer units of formula III″

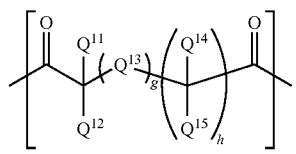

III′ where $Q^{11}$ and $Q^{14}$ are ethyl groups,
$Q^{12}$, $Q^{13}$ and $Q^{15}$ are independently hydrocarbon groups containing from 1 to 10 carbon atoms,
g is 0 or 1,
h is 0 or 1 when p is 0, and
h is 1 when p is 1.

\* \* \* \* \*

UNITED STATES PATENT AND TRADEMARK OFFICE
CERTIFICATE OF CORRECTION

PATENT NO. : 7,695,820 B2  Page 1 of 1
APPLICATION NO. : 11/421220
DATED : April 13, 2010
INVENTOR(S) : James Economy and Wei Xiao It is certified that error appears in the above-identified patent and that said Letters Patent is hereby corrected as shown below:

In the claims:

Col. 24, line 54, Claim 10 please delete "h is 0 or 1 when p is 0, and" and insert --h is 0 or when g is 0, and--.

Signed and Sealed this

Twenty-sixth Day of October, 2010

David J. Kappos
*Director of the United States Patent and Trademark Office*